United States Patent
Wada

(10) Patent No.: US 6,320,606 B1
(45) Date of Patent: Nov. 20, 2001

(54) TELEVISION CONFERENCE REGISTRATION METHOD AND TERMINAL THEREOF

(75) Inventor: Yoshiyasu Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/217,777

(22) Filed: Dec. 21, 1998

(30) Foreign Application Priority Data

Dec. 22, 1997 (JP) .................................................. 9-353126

(51) Int. Cl.$^7$ ...................................................... H04N 7/14
(52) U.S. Cl. ...................................... 348/14.01; 348/14.08; 348/14.09
(58) Field of Search .................................. 348/14, 15, 17; 370/260, 261; 379/90.01, 93.02, 93.03, 93.05, 202

(56) References Cited

U.S. PATENT DOCUMENTS

| | | | |
|---|---|---|---|
| 5,381,412 | * 1/1995 | Otani | 348/14 |
| 5,509,067 | * 4/1996 | Murata | 379/200 |
| 5,761,286 | * 6/1998 | Das et al. | 379/93.13 |
| 5,898,457 | * 4/1999 | Nagao et al. | 348/15 |

FOREIGN PATENT DOCUMENTS

| | | | |
|---|---|---|---|
| 2-60363 | 2/1990 | (JP) . | |
| 6-225054 | 8/1994 | (JP) . | |
| 8-149444 | 6/1996 | (JP) . | |
| 9-261350 | 10/1997 | (JP) . | |
| 406268772A | * 9/1994 | (JP) | H04M/11/00 |

OTHER PUBLICATIONS

Nature International Weekly Journal of Science, "Helical Microtubules of Graphitic Carbon" vol. 354, Nov. 1991, pp. 56–58.

Physical Review Letters, "Are Fullerene Tubules Metallic?" vol. 68, No. 5, Feb. 1992, pp. 631–634.

Japanese Office Action issued Jun. 1, 1999 in connection with a related application.

English–language translation of relevant portions of Japanese Office Action.

* cited by examiner

Primary Examiner—Curtis Kuntz
Assistant Examiner—Melur Ramakrishnaiah
(74) Attorney, Agent, or Firm—Ostrolenk, Faber, Gerb & Soffen, LLP

(57) ABSTRACT

A TV conference terminal which is used by a plurality users prevents an error connection at the conference held, makes the operation simple, and holds the conference smoothly. The TV conference terminal provides an operating panel wherein a user registers a password of each user, and the names and the abbreviated telephone number of partners and communication parameters. A backup RAM stores the above mentioned registered information and a controller controls this information. After the user registers the password, the name and the abbreviated telephone number of the partner are registered. After the registration of the above mentioned information, at the time when the TV conference terminal connects to the TV conference terminal of the partner, communication parameters decided by the communication procedure of ITU-T recommendation H.242 are registered in the backup RAM. When the user holds a subsequent conference with the registered partners, it is enough for the user to refers to the registered information and to decide the partner and the date. With this TV conference registration method and TV conference terminal, the object is achieved.

10 Claims, 3 Drawing Sheets

FIG. 2

| AREA 1a-1 | PASSWORD OF USER | |
|---|---|---|
| 1b-1 | ABBREVIATED TELEPHONE NUMBER | |
| | TELEPHONE NUMBER OF PARTNER | |
| AREA 1c-1 | COMMUNICATION PARAMETERS | COMMUNICATION SPEED :B/2B/H0/2H0etc.<br>VOICE MODE :G.711/G.722/G.728<br>DATA SPEED : ⎡(LSD)<br>⎢(HSD)<br>⎣(MLP) |
| AREA 1b-2 | ABBREVIATED TELEPHONE NUMBER | |
| | TELEPHONE NUMBER OF PARTNER | |
| AREA 1c-2 | COMMUNICATION PARAMETERS | COMMUNICATION SPEED :B/2B/H0/2H0etc.<br>VOICE MODE :G.711/G.722/G.728<br>DATA SPEED : ⎡(LSD)<br>⎢(HSD)<br>⎣(MLP) |

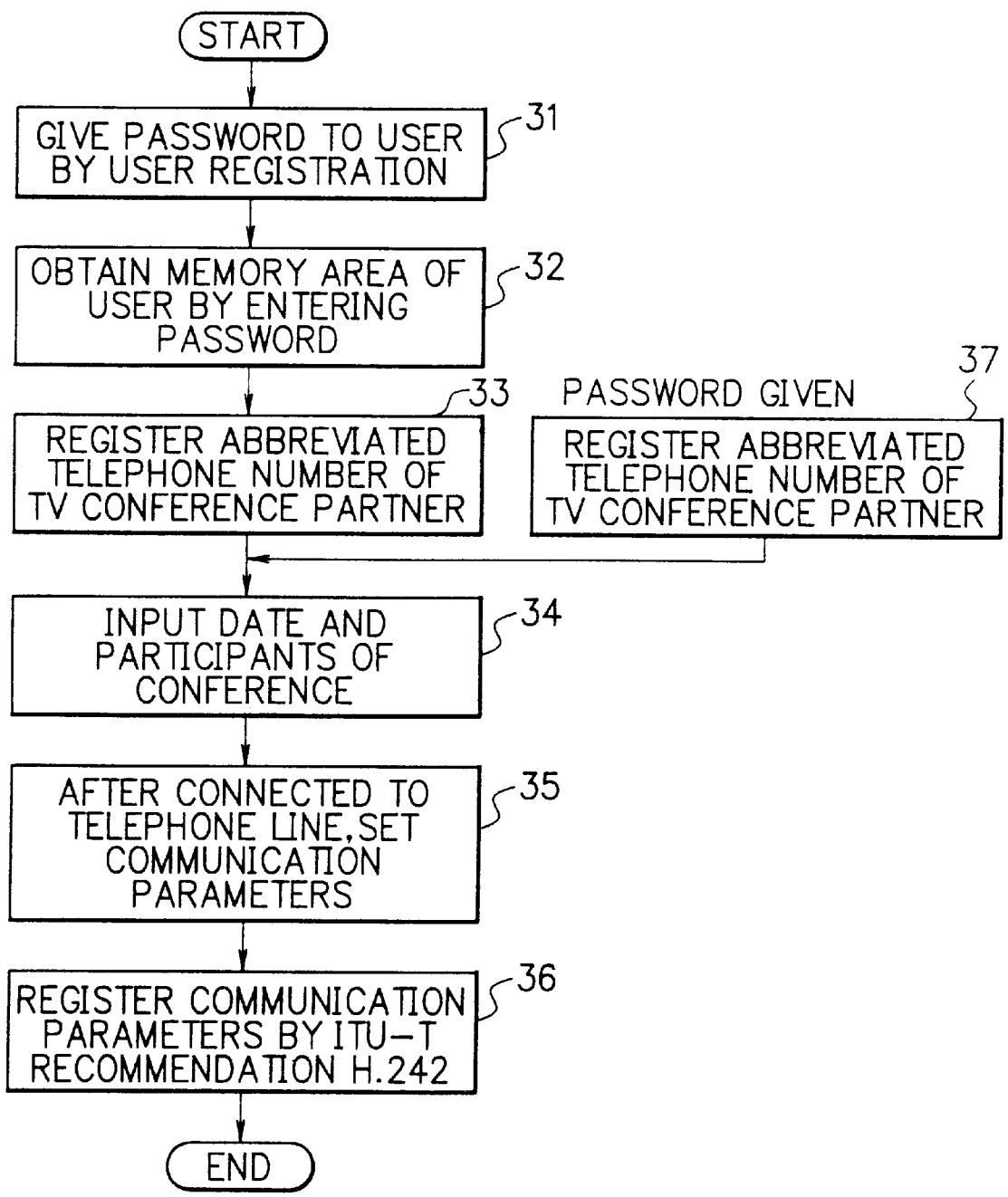

TELEVISION CONFERENCE REGISTRATION METHOD AND TERMINAL THEREOF

BACKGROUND OF THE INVENTION

The present invention relates to a television conference registration method and a terminal thereof which can be used by a plurality of users. Hereinafter the television conference is referred to as the TV conference.

Description of the Related Art

At conventional TV conference terminals, the terminals are mutually connected to plural terminals disposed at different places utilizing an ISDN (integrated services digital network). When a conference is held, the method to directly dial a telephone number of a partner or to dial an abbreviated telephone number of the partner registered beforehand is used as a dialing means for calling from a host TV conference terminal to a TV conference terminal of participants of the partner.

In the conventional way, the abbreviated telephone numbers of all users are generally registered at one terminal of the TV conference. The registered abbreviated telephone number has the information about the telephone number and the name of the TV conference terminal. At the time when the host TV conference terminal connects to the desired TV conference terminal, the host terminal displays a table having the registered information, selects a desired abbreviated telephone number and calls that number.

However, the conventional TV conference terminal has the following problems. A first problem is that at the case of the terminal which is used by plural users and calls using the abbreviated telephone number, the terminal needs time to search for the desired abbreviated telephone number from the many registered telephone numbers.

This is because at the conventional terminal, regardless of the number of users, the abbreviated telephone numbers are registered in unity in the total TV conference system and each terminal does not have a registration means for registering the abbreviated telephone number individually.

A second problem is that at the case which a user has used before and changed a voice mode and a data speed and so forth, a next user may not recognize this change and hold a TV conference. As a result, for example, a voice mode of G. 711 is applied and an image rate may be decreased. This is undesirable for the subsequent user.

The reason this problem occurs is that, regardless of connecting partners, the conventional terminal of the TV conference uses the communication parameters such as the voice mode and the data speed set beforehand and does not have a storing means for storing the communication mode while the communication regulated by the communication procedure ITU-T recommendation H.242 is preformed.

SUMMARY OF THE INVENTION

It is therefore an object of the present invention to provide a TV conference registration method and a terminal thereof in which a user inputs each password of a user and registers an abbreviated telephone number and a name of a partner. The user further, registers communication parameters such as a voice mode, a communication speed, a data speed and so forth. With these entries the user can hold a conference with a setting registered by the user and can search for the partner within the registered abbreviated telephone numbers, can prevent an error connection and can hold a conference smoothly without complexity.

According to a first aspect of the present invention, to achieve this object, the TV conference registration method using a TV conference terminal used by plural users holding conferences in common provides the steps of giving a password for a user, inputting the password by the user, inputting an abbreviated telephone number of a TV conference terminal of a partner to whom said user inputted said password wants to connect, registering said inputted password and said abbreviated telephone number of the TV conference terminal of the partner attached to said password, and connecting to a telephone line of said registered partner using said abbreviated telephone number.

According to a second aspect of the present invention, it is desirable that the TV conference registration method has a registering step to register the setting of communication parameters including a voice mode, a communication speed and a data speed attached to said password, at the connection to the telephone line of the TV conference terminal of the partner from the TV conference terminal used by the plural users in common.

According to a third aspect of the present invention, the TV conference terminal which is used by plural users in common provides a password giving means for giving a password for a user upon request of a registration of the user, a first registration means for storing the password inputted by the user, a second registration means for storing an abbreviated telephone number of the TV conference terminal of a partner attached to said password inputted by said user, and a connecting means for connecting to a telephone line of the TV conference terminal of the partner using the stored abbreviated telephone number by controlling the operation of the TV conference terminal of the user.

According to a fourth aspect of the present invention, the TV conference terminal at the communication with said TV conference terminal of the partner, implements the communication procedure of ITU-T recommendation H.242 responding to the communication parameters including a voice mode, a communication speed and a data speed registered attaching to the password. In this case, the TV conference terminal registers the communication parameters decided by said communication procedure of ITU-T recommendation H.242 attached to said abbreviated telephone number. With this, at the time when said TV conference terminal connects to the TV conference terminal of the partner again, said TV conference terminal implements the communication procedure of ITU-T recommendation H.242 using the communication parameters including the voice mode, communication speed and data speed registered attaching to the abbreviated telephone number. This operation is desirable.

BRIEF DESCRIPTION OF THE DRAWINGS

The objects and features of the present invention will become more apparent from the consideration of the following detailed description taken in conjunction with the accompanying drawings in which:

FIG. 2 is a table showing contents of a backup RAM of the present invention; and FIG. 3 is a flowchart showing a registration method of the TV conference terminal of the present invention.

DESCRIPTION OF THE PREFERRED EMBODIMENTS

Figure 1:
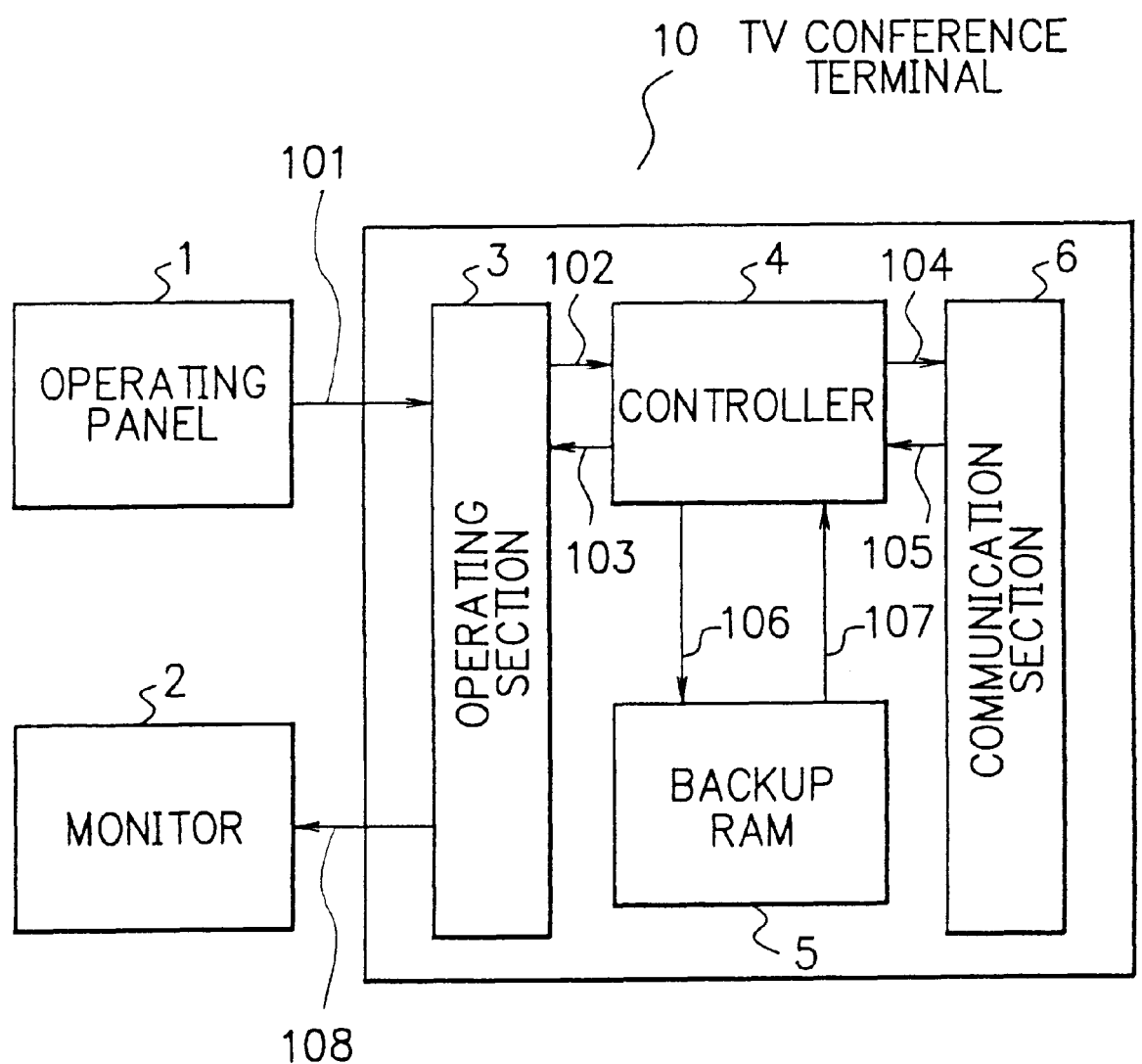
FIG. 1 is a block diagram showing an embodiment of a TV conference terminal of the present invention.

Referring now to the drawings, embodiments of the present invention are explained in detail. FIG. 1 is a block diagram showing an embodiment of a TV conference terminal of the present invention. This TV conference terminal implements the communication of an image, a voice and data.

A TV conference terminal 10 provides a operating panel 1 in which a user sets various kinds of parameters, registers abbreviated telephone numbers and inputs operating information needed at a TV conference. An operating section 3 analyzes the operating signals inputted from the operating panel 1 and directs the control. A controller 4 sets various parameters in a backup RAM 5, registers abbreviated telephone numbers by the direction of control inputted from the operating section 3, and reads out the registered contents from the backup RAM 5. A communication section 6 implements the communication control of transmitting of the information inputted from the controller 4 and the communication control of receiving received information. A monitor 2 displays the read out result of the registered contents.

Referring to FIGS. 2 and 3, the registering procedure of the abbreviated telephone numbers of the present invention is explained. FIG. 2 is a table showing contents of a backup RAM 5 of the present invention and FIG. 3 is a flowchart showing a registration method of the TV conference terminal of the present invention.

First, a password is given to the user by the user registration (step 31). The user inputs a request of the password registration 101 to the operating panel 1 and the operating section 3 analyzes the request of the password registration 101 and inputs the password 102 to the controller 4 and also inputs the display request 108 of the contents of the user operation to the monitor 2.

The controller 4 stores the inputted password 102 in a password registration area 1a-1 in the backup RAM 5. At the same time, an abbreviated telephone number registration area 1b-1 and a communication parameter registration area 1c-1, are obtained. Theses memory areas for the user (step 32).

After this process, the user inputs the name of the partner, the telephone number or the abbreviated telephone number of the partner, and registers the abbreviated telephone number at the operating panel 1 (step 33). When the password of the user has already been registered, this registration process is started from step 37 (step 37).

The controller 4 stores the inputted name and the telephone number or the abbreviated telephone number of the partner through the operating section 3 to the abbreviated telephone number registration area 1b-1 in the backup RAM 5. After storing this data, a next abbreviated telephone number registration area 1b-2 and a next communication parameter registration area 1c-2 are obtained in the backup RAM 5 and the controller 4 prepares for the storing of the name, telephone number and abbreviated telephone number of a next partner. There after the date and the participants of the conference to be held are inputted (step 34).

Next, the registration of the communication parameter is explained. The user inputs the password and the list of the registered abbreviated telephone numbers is displayed on the monitor 2.

Selecting the abbreviated telephone number of the desired partner from the list displayed on the monitor 2, the selected abbreviated telephone number is outputted to the controller 4 through the operating section 3.

The controller 4 reads out the registered contents of the designated abbreviated telephone number from the backup RAM 5 and outputs a telephone number 104 to the communication section 6.

The communication section 6, after connecting to the telephone line, decides the communication parameters such as the voice mode, the communication speed, the data speed and so forth during communication by the 10 communication procedure of ITU-T recommendation H.242 (step 35). After deciding the parameters, the information about these parameters 105 is outputted to the controller 4.

The controller 4 stores the information about the parameters 105 in the communication parameter registration area 1c-1 in the backup RAM 5 (step 36).

After this registration, depending on the contents of the registration, the TV conference terminal implements the connection for the conference at the designated date.

As mentioned above, the user registers the password, the abbreviated telephone number and name of the partners are registered by each user, the communication parameters such as the voice mode, communication speed, data speed and so forth are registered at the connected time to the partner with the abbreviated telephone number of the partner. With this registration, at the next connection of the partner, even if the TV conference terminal is set in a different state from the desired state, the TV conference terminal can connect to a partner in a state that was set beforehand.

In FIG. 2, the memory areas of only two partners are shown as an example, however the memory areas of the backup RAM 5 are able to be expanded to the number of partners which the user needs.

As explained above, a first effect of the present invention is that one TV conference terminal used by the plural users is usable with higher efficiency. The reason is that each user has his or her own password and in each password the abbreviated telephone number and name of the partner are registered and, in addition, the communication parameters such as the voice mode, communication speed and data speed of the partner are also registered. With this, at the time the user holds a conference, the user can search for participants from his or her own list of the abbreviated telephone number and the user can easily operate the conference.

A second effect of the present invention is that the TV conference is held more smoothly. The reason is that as the registered information of the abbreviated telephone number, not only the name and telephone number but the communication parameters such as the voice mode, communication speed and data speed during the communication are registered beforehand by the communication procedure of ITU-T recommendation H.242. Therefore the time used for the communication procedure is saved and the TV conference can be held easily.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of registering a conferencing partner associated with a user in a television conference, said method comprising:

receiving a user identification;

receiving a telephone number of said partner from said user;

storing said telephone number in association with said partner and said user identification;

establishing a connection with said partner using said stored telephone number;

determining communication parameters for communicating between said user and said partner in said television conference based on said connection; and storing said communication parameters in association with said user identification and said partner.

2. The method as claimed in claim 1, wherein said communication parameters implement a communication speed and data speed.

3. The method as claimed in claim 2, wherein said communication parameters implement a communication procedure of ITU-T recommendation H.242.

4. A database for indexing data associating a conferencing partner with a user in a television conference, said database comprising:

a first area including data relating to a registration of said user;

a second area including data relating to a telephone number of said partner entered by said user, said second area being associated with said first area; and a third area including communication parameters used in communicating between said user and said partner in said television conference, said communication parameters determined by connecting said user with said partner using said telephone number stored in said second area, said third area being associated with said first area and said second area.

5. The database as claimed in claim 4, wherein said communication data is at least one of voice mode, communication speed, and data speed.

6. The database as claimed in claim 5, wherein said communication data implement a communication procedure of ITU-T recommendation H.242.

7. A computer readable storage medium containing data for performing:

receiving a user identification;

receiving a telephone number of a conferencing partner from said user, said partner being associated with said user;

storing said telephone number in association with said user identification;

establishing a connection with said partner using said stored telephone number;

determining communication parameters for communicating between said user and said partner in a television conference based on said connection; and storing said communication parameters in association with said user identification and said partner.

8. The computer readable storage medium as claimed in claim 7, wherein said communication parameters are at least one of voice mode, communication speed and data speed.

9. The computer readable storage medium as claimed in claim 7, wherein said communication parameters implement a communication procedure of ITU-T recommendation H.242.

10. A television conference terminal comprising:

an input which receives a user identification for a user, receives a partner identification for a conference partner from said user, and receives a telephone number associated with said partner identification from said user;

a memory; and a controller which stores said partner identification and telephone number in association with said user identification; wherein said controller establishes a connection with said partner using said stored telephone number, determines communication parameters between said user and said conference partner in a television conference based on said connection, and said controller stores said communication parameters in said memory in association with said user identification and said partner identification.

* * * * *